United States Patent [19]
SanGregory et al.

[11] Patent Number: 5,914,750
[45] Date of Patent: Jun. 22, 1999

[54] SHUTTER INCLUDING A CAPPING ELEMENT MOVABLE BETWEEN LIGHT-BLOCKING AND NON-LIGHT-BLOCKING POSITIONS

[75] Inventors: Jude Anthony SanGregory, Spencerport; Wilbert Frank Janson, Jr., Shortsville, both of N.Y.

[73] Assignee: Eastman Kodak Company, Rochester, N.Y.

[21] Appl. No.: 08/104,960

[22] Filed: Aug. 9, 1993

[51] Int. Cl.⁶ .......................... H04N 5/238; H04N 5/225
[52] U.S. Cl. .......................... 348/368; 348/374; 396/494
[58] Field of Search .................. 358/209, 228, 358/229; 354/226, 235.1, 236, 254, 255; 352/209, 215, 216; 348/362, 363, 368, 373, 374, 375; 396/494; H04N 5/238, 5/225

[56] References Cited

U.S. PATENT DOCUMENTS

| Re. 31,547 | 4/1984 | Meyer et al. ........................... 354/135 |
|---|---|---|
| 3,114,306 | 12/1963 | Nieuwenhoven et al. ............... 95/12.5 |
| 3,735,687 | 5/1973 | Park ........................................ 95/61 |
| 3,936,168 | 2/1976 | Schild .................................... 352/209 |
| 4,108,543 | 8/1978 | Leistner ................................. 352/121 |
| 4,536,069 | 8/1985 | Kunica .................................. 354/265 |
| 4,695,887 | 9/1987 | Peterson ............................. 358/213.13 |
| 4,699,483 | 10/1987 | Swinehart ............................... 352/216 |
| 4,743,108 | 5/1988 | Vogel et al. ............................ 352/216 |
| 5,028,946 | 7/1991 | Shinozaki et al. ..................... 354/250 |
| 5,150,702 | 9/1992 | Miyanaga et al. ..................... 358/228 |

FOREIGN PATENT DOCUMENTS

| 0 182 334 | 5/1986 | European Pat. Off. ....... H04N 5/225 |
|---|---|---|
| 61-114231 | 5/1986 | Japan ............................... G03B 9/10 |

*Primary Examiner*—Wendy Garber
*Assistant Examiner*—Ngoc-Yen Vu
*Attorney, Agent, or Firm*—Gordon M. Stewart

[57] ABSTRACT

A shutter intended for use with a light-sensitive material. The shutter includes a light-blocking disk having a light-passing portion through which light can pass to reach a light-sensitive material. The disk is rotated to locate its light-passing portion in line with the light-sensitive material to allow light passing through the light-passing portion to advance towards the light-sensitive material. The shutter also includes a capping element which is moved between a light-blocking position and a non-light-blocking position relative to the light-sensitive material and the light-passing portion of the disk. A single sensor is used to detect a predetermined rotational position of the disk and in response thereto the capping element is moved from one of its light-blocking and non-light-blocking positions to the other.

5 Claims, 4 Drawing Sheets

SHUTTER INCLUDING A CAPPING ELEMENT MOVABLE BETWEEN LIGHT-BLOCKING AND NON-LIGHT-BLOCKING POSITIONS

FIELD OF THE INVENTION

This invention relates generally to the field of still video image capture, and, more particularly, to a shutter intended for use with a light-sensitive material.

BACKGROUND OF THE INVENTION

Japanese Application No. 59-236445 filed in Japan on Nov. 9, 1984 and entitled "Fast Mechanical Shutter", discloses a fast shutter part which rotates continuously. Also included is a photographic shutter part which operates intermittently and an electric circuit which (1) drives the fast shutter part and photographic shutter part by receiving an external image pickup command signal and (2) performs fast mechanical shutter operation.

A slit 5b in the fast shutter part passes by a sensor 8 which then sends an indication signal for closure to a camera shutter 6. A slit 5c in the fast shutter part passes by a sensor 9 which then sends an indication signal for opening the camera shutter 6. A cut part 5a in the fast shutter part only passes through an optical path 10 after the slit 5c passes by the sensor 9 and before the slit 5b passes by the sensor 8 so that light 10 reaches an element 3'. The shutter speed is determined by the rotating speed of the disk and the angle of opening of the cut part 5a viewed from a center shaft of the disk.

PROBLEMS TO BE SOLVED BY THE INVENTION

The fast mechanical shutter described above requires two sensors and two slits in the fast shutter part to effect opening and closing of the camera shutter 6. Having two sensors increases the cost of such a mechanical shutter.

When sensor 9 detects slit 5c, cut part 5a in the mechanical shutter will have been rotated to a position almost 180 degrees from its position in FIG. 2. At this point camera shutter 6 will begin to open. Camera shutter 6 must be fully open by the time cut part 5a begins to sweep past element 3'. The fast shutter part is being rotated very quickly and camera shutter 6 must open during the time it takes the fast shutter part to rotate about ½ of a revolution. As a result, camera shutter 6 must be opened extremely quickly. Such rapid opening of the camera shutter is difficult to do and can damage parts due to high impact forces. These impact forces can also reduce image quality. This same problem exists when camera shutter 6 is being closed.

A further problem with the above described fast mechanical shutter is that the fast shutter part is not balanced for rotational stability. The fast shutter part will experience imbalanced centrifugal forces which can effect the rate of rotation of the fast shutter part and cause damage to various parts in the fast mechanical shutter.

SUMMARY OF THE INVENTION

According to one aspect of the invention, a shutter is disclosed which is intended for use with a light-sensitive material. The shutter includes a light-blocking disk having a light-passing portion through which light can pass to reach a light-sensitive material. The disk is rotated to locate its light-passing portion in line with the light-sensitive material to allow light passing through the light-passing portion to advance towards the light-sensitive material. The shutter also includes a capping element which is moved between a light-blocking position and a non-light-blocking position relative to the light-sensitive material and the light-passing portion of the disk. A single sensor is used to detect a predetermined rotational position of the disk and in response thereto the capping element is moved from one of its light-blocking and non-light-blocking positions to the other.

ADVANTAGEOUS EFFECTS OF THE—PREFERRED EMBODIMENT

In the preferred embodiment, one sensor is used to detect a predetermined rotational position of the disk and in response thereto move the capping element from one of its light-blocking and non-light-blocking positions to the other. Having one sensor rather than two reduces the cost and increases the reliability of such a shutter.

Movement of the capping element from one of its light-blocking and non-light-blocking positions to the other is commenced just after the light-passing portion of the disk has been rotated past the light-sensitive material. As such, the capping element has the entire time, during which the disk blocks light from reaching the light-sensitive material, to move from one of the positions to the other prior to the light-passing portion of the disk being rotated past the light-sensitive material. Such an arrangement minimizes impact forces on the capping element, thereby enhancing the shutter's robustness and image quality.

Further, the disk has a portion removed to counterbalance the light-passing portion of the disk such that imbalanced centrifugal forces caused by rotating the disk are minimized.

DETAILED DESCRIPTION OF THE INVENTION

Figure 1:
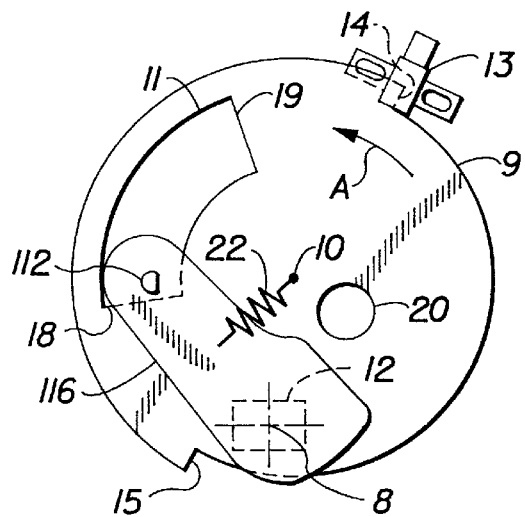
FIGS. 1–7 are front views of a light blocking disk during various stages of rotation, a capping element in various positions and a sensor.
Figure 8:
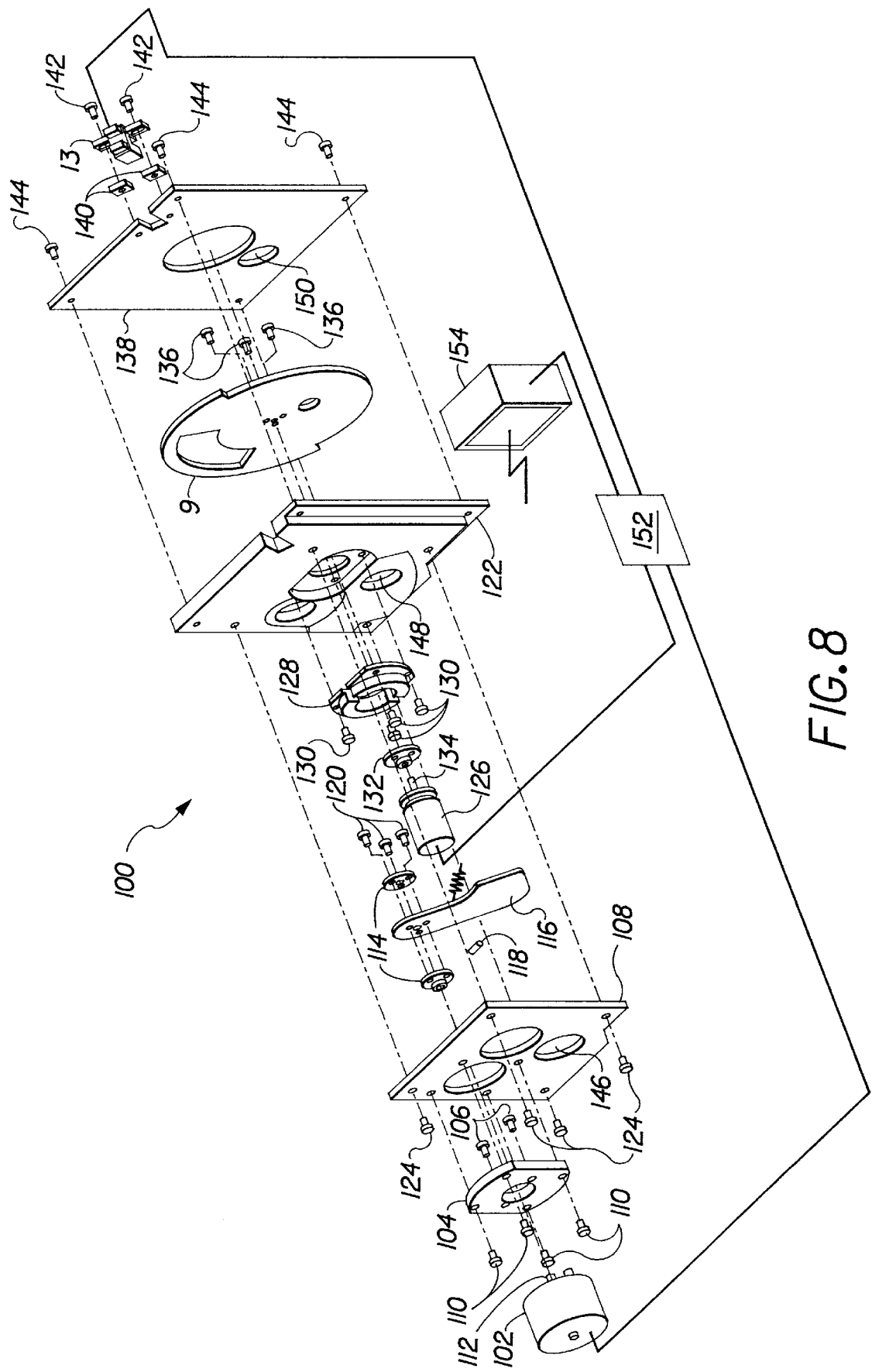
FIG. 8 is an exploded perspective view of a shutter which includes the elements shown in FIGS. 1–7.
Figure 9:
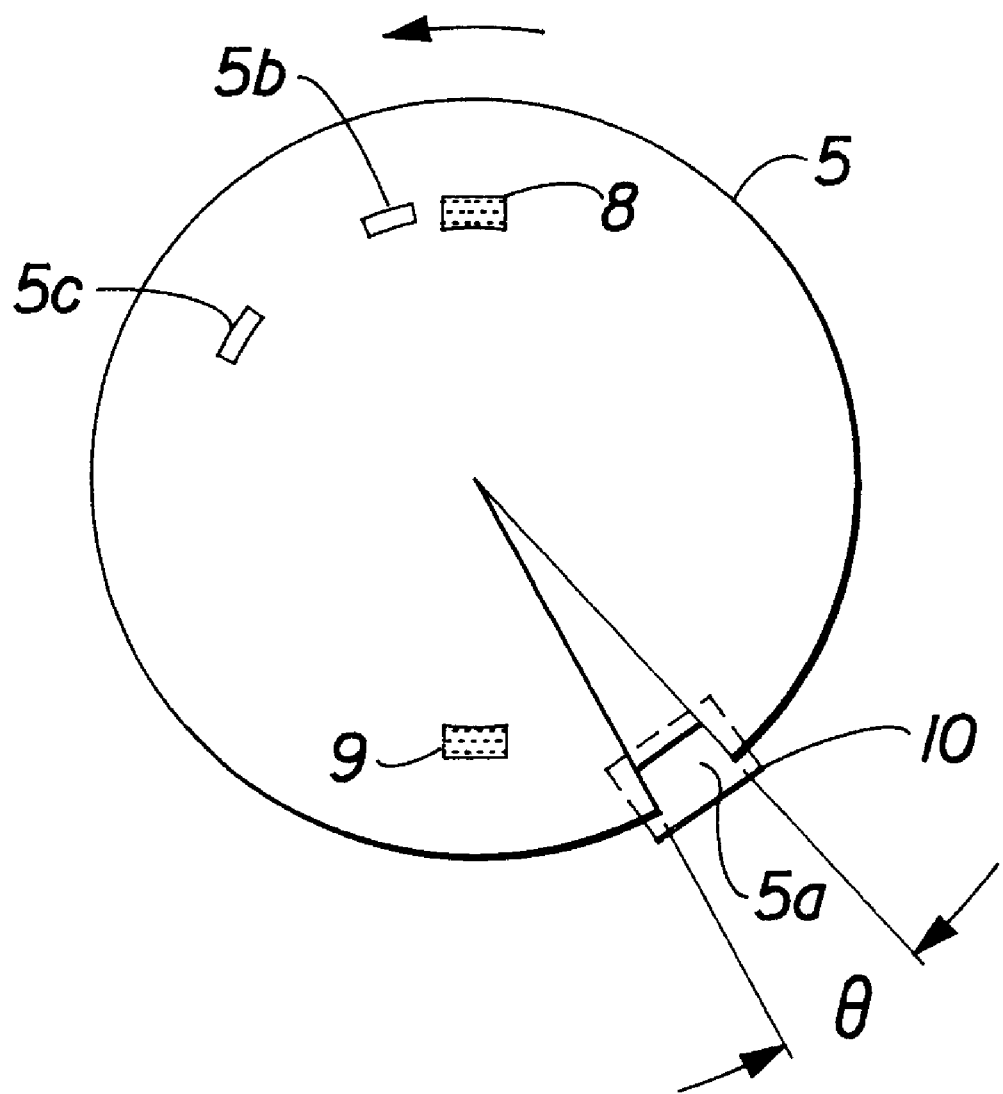
FIG. 9 shows a conventional fast shutter part.

Referring now to the drawings,

FIG. 8 shows an exploded view of a shutter designated generally by the reference numeral 100. A rotary solenoid 102 is mounted to a solenoid mount 104 by fasteners 106. Solenoid mount 104 is secured to a front plate 108 by fasteners 110. A solenoid drive shaft 112 passes through apertures in the solenoid mount and front plate, and is secured to a pair of capping hubs 114 and a capping element 116 which is sandwiched between the capping hubs. A fastener 118 secures one of the capping hubs to drive shaft 112 and fasteners 120 secure the other capping hub and capping element 116 to the capping element secured to drive shaft 112. Solenoid 102 is used to move capping element 116. Front plate 108 is secured to a mechanical plate 122 by fasteners 124.

A permanent magnet DC motor 126 is mounted to mechanical plate 122 with a pair of mounts 128. Mounts 128 are secured to mechanical plate 122 with fasteners 130. A disk hub 132 is secured to a motor drive shaft 134. A light-blocking disk 9 is secured to disk hub 132 with fasteners 136. Motor 126 is used to rotate disk 9.

An optical sensor 13 is secured to a back plate 138 using a pair of shims 140 and fasteners 142. Optical sensor 13 includes an LED and a photodiode. Back plate 138 is secured to mechanical plate 122 with fasteners 144.

Front plate 108 has an aperture 146, mechanical plate 122 has an aperture 148 and back plate 138 has an aperture 150. Apertures 146, 148 and 150 define an optical axis along which light can travel towards a light sensitive material.

A logic and control unit (LCU) 152 is connected to and controls the operation of solenoid 102, motor 126, sensor 13 and light flash unit 154. Light flash unit 154 is utilized to illuminate a subject whose image is being captured on a light-sensitive material. LCU 152 receives feedback from the various elements with which it is connected such that the LCU can properly time the occurrence of certain events to be described below.

Turning now to FIGS. 1–7, operation of shutter 100 will be described. In FIG. 1, disk 9 is being rotated about its axis 10 in the direction of an arrow A by motor 126. Disk 9 has a light-passing portion 11 through which light can pass. The light-passing portion includes a leading edge 18 and a trailing edge 19. Disk 9 also has a cutout portion, bordered by a pair of edges 14 and 15, and an aperture 20 which in combination counterbalance light-passing portion 11 to minimize imbalanced centrifugal forces caused by rotating disk 9.

Capping element 116 is shown in a light-blocking position relative to a light-sensitive material 12, such as silver halide film, and light passing portion 11. A return spring 22 biases capping element towards the light blocking position. When capping element 116 is in the light-blocking position, light cannot reach light-sensitive material 12. An optical axis is designated by the reference numeral 8. Sensor 13 is displayed relative to its position to disk 9.

Figure 2:
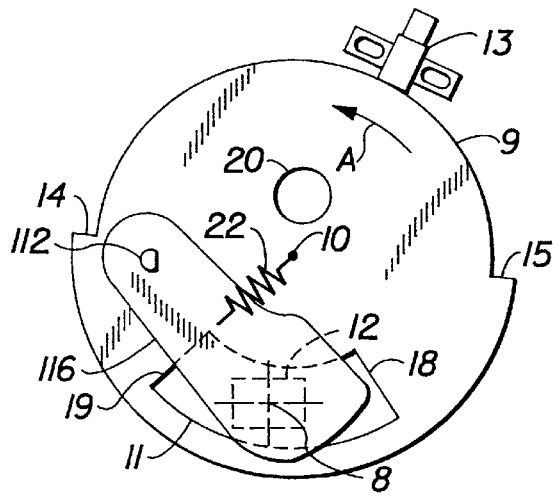

In FIG. 2, disk 9 has been rotated such that light-passing portion 11 is in line with light-sensitive material 12. Light cannot reach light-sensitive material 12 because capping element 116 is still in its light-blocking position.

Figure 3:
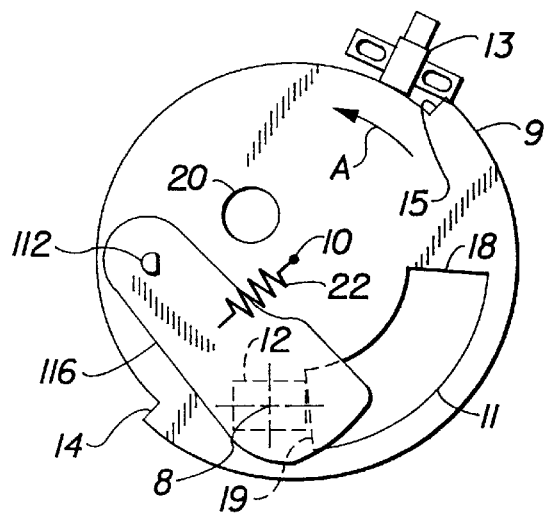
Figure 4:
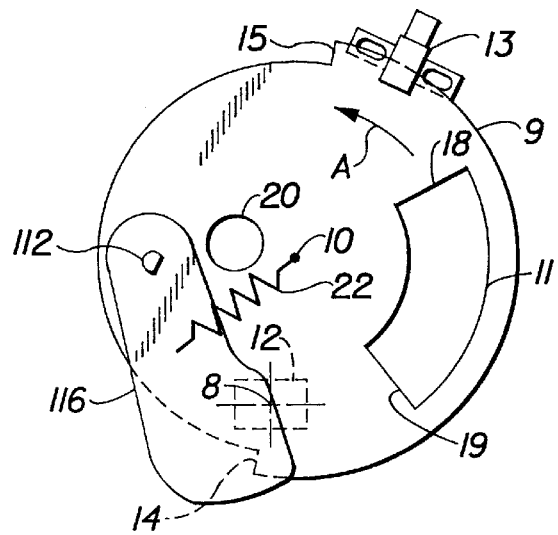

Referring to FIGS. 3 and 4, disk 9 has been further rotated such that light-passing portion 11 has just been rotated past light-sensitive material 12. In FIG. 4 it can be seen that a portion of disk 9 has passed through sensor 13. The LED and photodiode in sensor 13 detect edge 15 of disk 9 and thereby detect a predetermined rotational position of disk 9. Detection of edge 15 by sensor 13 is transmitted to LCU 152 (FIG. 8) which utilizes the positional information and disk velocity to time actuation of certain events to be described below.

For example, LCU 152 causes solenoid 102 to be energized to commence moving capping element 116 from its light-blocking position towards a non-light-blocking position. Energization of the solenoid is timed such that capping element 116 starts uncovering light-sensitive material 12 just after trailing edge 19 of light-passing portion 11 has been rotated past light-sensitive material 12. The amount and length of energization of solenoid 102 is determined by, among other things, the rotational velocity of disk 9. Once capping element 116 has reached sufficient velocity, the solenoid is deenergized. The momentum of the capping element causes it to rotate to the non-light-blocking position. Spring 22 decelerates capping element 116 as the capping element approaches the non-light-blocking position to reduce impact forces on the capping element. If disk 9 is rotating at a relatively slow velocity, it may be necessary to reenergize the solenoid in pulses to hold capping element 116 in the non-light-blocking position.

In FIG. 4 it can be seen that capping element has been rotated clockwise from its position in FIG. 3. By actuating the solenoid to cause capping element 116 to start uncovering light-sensitive material 12 just after trailing edge 19 has been rotated past light-sensitive material 12, the maximum time is provided to move capping element 116 to a non-light-blocking position prior to leading edge 18 being rotated past the light-sensitive material. Consequently, capping element 116 can be moved slower resulting in smaller forces from accelerating and decelerating the capping element.

Figure 5:
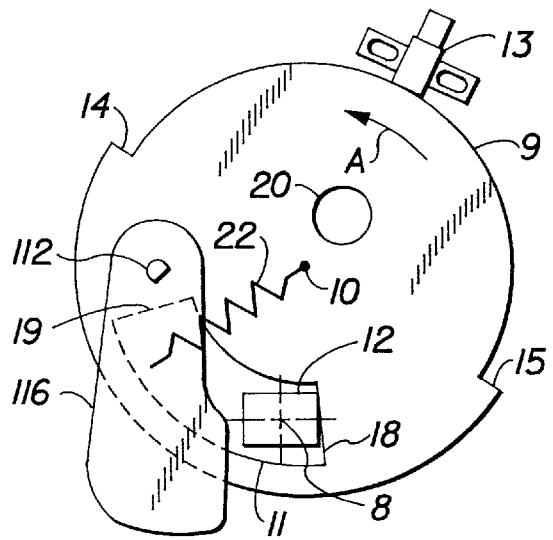

Turning now to FIG. 5, capping element 116 has been rotated to its non-light-blocking position. Disk 9 continues to rotate such that light-passing portion 11 is in line with light-sensitive material 12. Light can now pass through the light-passing portion to reach and expose the light sensitive material. If light flash 154 is being used, LCU 152 causes the light flash to be actuated during the time the capping element is in its non-light-blocking position and light passing portion 11 is in line with light sensitive material. As such, a subject whose image is being captured will be illuminated during exposure of the light-sensitive medium.

Figure 6:
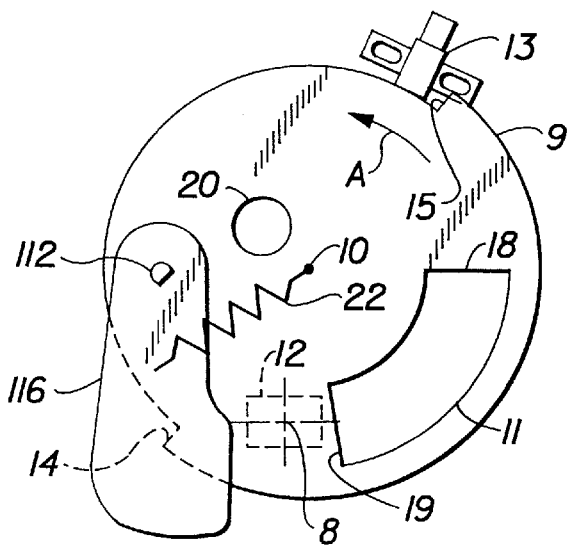

Referring to FIG. 6, light-passing portion 11 has again been rotated past light-sensitive material 12. Spring 22 commences moving capping element 116 towards the light-blocking position. If solenoid 102 was pulsed to hold the capping element in the non-light-blocking position, LCU 152 causes solenoid 102 to be deenergized, allowing return spring 22 to move capping element 116 towards the light blocking position. The solenoid is deenergized such that capping element 116 starts moving just after trailing edge 19 of light-passing portion 11 has been rotated past the capping element. As a result, capping element 116 has the maximum time to move to the light-blocking position prior to leading edge 18 reaching light sensitive material 12.

Preferably, solenoid 102 is momentarily energized prior to capping element 116 reaching its light blocking position. This momentary energization of the solenoid decelerates capping element 116 helping to reduce impact forces on the capping element when it reaches its light-blocking position.

Figure 7:
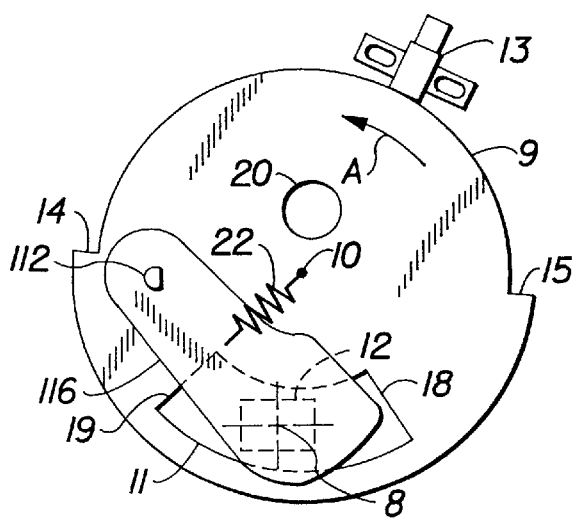

Turning now to FIG. 7, capping element 116 has been returned to its light blocking position by spring 22, thereby preventing light from reaching light-sensitive material 12.

The invention has been described in detail with particular reference to a preferred embodiment thereof, but it will be understood that variations and modifications can be effected within the spirit and scope of the present invention.

PARTS LIST FOR FIGS. 1–8

A arrow
8 optical axis
9 light-blocking disk
10 disk axis
11 light-passing portion of disk
12 light-sensitive material
13 optical sensor
14 disk edge
15 disk edge
18 leading edge
19 trailing edge
20 aperture
22 return spring
100 shutter
102 rotary solenoid
104 solenoid mount
106 fasteners
108 front plate
110 fasteners
112 solenoid drive shaft
114 capping hubs
116 capping element 118 fastener
120 fasteners
122 mechanical plate
124 fasteners
126 motor
128 mounts
130 fasteners
132 disk hub
134 motor drive shaft
136 fasteners
138 back plate
140 shims
142 fasteners
144 fasteners
146 aperture
148 aperture
150 aperture
152 LCU
154 flash unit

What is claimed is:

1. A shutter intended for use with a light-sensitive material, comprising:

a light-blocking disk having a light-passing portion through which light can pass to reach a light-sensitive material;

means for rotating said disk to locate its light-passing portion in line with the light-sensitive material to allow light passing through said light-passing portion to advance towards the light-sensitive material;

a capping element;

means for moving said capping element between a light-blocking position completely blocking light from reaching said light-sensitive material and a non-light-blocking position relative to the light-sensitive material and said light-passing portion of said disk; and sensor means for detecting a predetermined rotational position of said disk and in response thereto causing said moving means to move said capping element from one of its light-blocking and non-light-blocking positions to the other.

2. The shutter of claim 1, wherein detection of said predetermined rotational position by said sensor means is used to time movement of said capping element from one of its light-blocking and non-light-blocking positions to the other, such that said capping element has a maximum time to move from one of said positions to the other while said disk is blocking light from reaching said light-sensitive material.

3. The shutter of claim 1, wherein detection of said predetermined rotational position by said sensor means is used to time actuation of a light flash such that said light flash is actuated when said capping element is in said non-light-blocking position and when said light-passing portion of said disk is in line with the light-sensitive material.

4. The shutter of claim 1, wherein said disk has a portion removed to counterbalance said light-passing portion of said disk such that imbalanced centrifugal forces caused by rotating said disk are minimized.

5. The shutter of claim 1, wherein said moving means includes a rotary solenoid, movement of said capping element from (1)said light-blocking position to said non-light-blocking position being caused by energizing said solenoid and (2) said non-light-blocking position to said light-blocking position being caused by deenergizing said solenoid thereby allowing a return spring to move said capping element towards said light-blocking position, said solenoid being momentarily energized as said capping element is moving toward said light-blocking position to decelerate said capping element and reduce impact forces on the capping element.

* * * * *